(12) United States Patent
Tomasso

(10) Patent No.: US 10,110,602 B2
(45) Date of Patent: *Oct. 23, 2018

(54) SECURE INTERNAL DATA NETWORK COMMUNICATION INTERFACES

(71) Applicant: KCT HOLDINGS, LLC, Turnersville, NJ (US)

(72) Inventor: Keiron Christopher Tomasso, Turnersville, NJ (US)

(73) Assignee: KCT HOLDINGS, LLC, Turnersville, NJ (US)

( * ) Notice: Subject to any disclaimer, the term of this patent is extended or adjusted under 35 U.S.C. 154(b) by 204 days.

This patent is subject to a terminal disclaimer.

(21) Appl. No.: 15/339,223

(22) Filed: Oct. 31, 2016

(65) Prior Publication Data

US 2017/0048278 A1 Feb. 16, 2017

Related U.S. Application Data

(63) Continuation-in-part of application No. 15/063,106, filed on Mar. 7, 2016, now Pat. No. 9,485,277, which
(Continued)

(51) Int. Cl.
*G06F 21/00* (2013.01)
*H04L 29/06* (2006.01)
(Continued)

(52) U.S. Cl.
CPC .......... *H04L 63/10* (2013.01); *H04L 12/4633* (2013.01); *H04L 63/0272* (2013.01);
(Continued)

(58) Field of Classification Search
CPC ..... H04L 63/10; H04L 63/30; H04L 63/0272; H04L 63/105; H04L 12/4633; H04L 63/164; H04L 67/02
See application file for complete search history.

(56) References Cited

U.S. PATENT DOCUMENTS 7,623,458 B2* 11/2009 Ayyagari .................. H04L 9/00
370/235
8,032,763 B2 10/2011 Modica et al.
(Continued)

OTHER PUBLICATIONS

Criste, "Implementing the Global Information Grid" May 18, 2004, pp. 1-24. *Cited in parent application.
(Continued)

*Primary Examiner* — Lisa C Lewis
(74) *Attorney, Agent, or Firm* — Volpe and Koenig, P.C.

(57) ABSTRACT

A system, method, and apparatus for providing secure communications to one or more users through an unclassified network. The system may include a network access management device may have a plurality of internal data network communications interfaces configured to communicate with at least one classified computing device using a National Security Agency (NSA) Commercial Solution for Classified (CSfC) comprised solution and an external data network communications interface configured to communicate with an unclassified network. A network access management device may use an inner NSA CSfC approved tunneling technology, an outer NSA CSfC approved tunneling technology, and a processor configured to perform processing and routing protocols associated with interconnecting the internal data network communications interface and the external data network communications interface.

19 Claims, 17 Drawing Sheets

Related U.S. Application Data is a continuation of application No. 14/480,265, filed on Sep. 8, 2014, now Pat. No. 9,282,105, which is a continuation of application No. 12/956,401, filed on Nov. 30, 2010, now Pat. No. 8,832,425.

(60) Provisional application No. 61/265,464, filed on Dec. 1, 2009.

(51) Int. Cl.
*H04L 12/46* (2006.01)
*H04L 29/08* (2006.01)

(52) U.S. Cl.
CPC ............ H04L 63/105 (2013.01); H04L 63/30 (2013.01); *H04L 63/164* (2013.01); *H04L 67/02* (2013.01)

(56) References Cited

U.S. PATENT DOCUMENTS

| | | | |
|---|---|---|---|
| 8,219,799 B1* | 7/2012 | Lucchesi | H04L 63/105 713/150 |
| 2007/0005780 A1 | 1/2007 | Hanson | |
| 2009/0019527 A1* | 1/2009 | Winslow | H04L 63/0272 726/4 |
| 2010/0017599 A1* | 1/2010 | Sellars | G06Q 20/02 713/156 |
| 2010/0254395 A1 | 10/2010 | Smith et al. | |
| 2011/0103393 A1 | 5/2011 | Meier et al. | |

OTHER PUBLICATIONS

Nakamoto, "Scalable HAIPE Discovery" 2006 in Visualizing Network Information pp. 1-14. *Cited in parent application.

Information Assurance Specialists, "Executive Computing Kit" retrieved Dec. 11, 2012 from www.iaspecialists.com/docs/IAS_ECK-Datasheet.pdf pp. 1-2. *Cited in parent application.

Taclane Multibook Secure Laptop, retrieved Dec. 11, 2012 from http://www.gdc4s.com/Documents/Products/Computing/TACLANE-MultiBook/GD-TACLANE-MultiBook.pdf, pp. 1-2. *Cited in parent application.

* cited by examiner

SECURE INTERNAL DATA NETWORK COMMUNICATION INTERFACES

CROSS REFERENCE TO RELATED APPLICATIONS

This application is a continuation-in-part of U.S. patent application Ser. No. 15/063,106 filed Mar. 7, 2016, which is a continuation of U.S. patent application Ser. No. 14/480,265 filed Sep. 8, 2014, which issued on Mar. 8, 2016 as U.S. Pat. No. 9,282,105, which is a continuation of U.S. patent application Ser. No. 12/956,401 filed Nov. 30, 2010, which issued on Sep. 9, 2014 as U.S. Pat. No. 8,832,425, which claims the benefit of U.S. provisional application No. 61/265,464 filed Dec. 1, 2009, which are incorporated by reference as if fully set forth.

BACKGROUND

The government and military widely use internet protocol (IP) based communications, including use in dynamic operational environments. Dynamic operational environments can take place in hotel rooms, residences, forward operating bases, and/or other impromptu temporary locations. Dynamic operating environments are considered to be any location where an individual, or individuals, desires to connect to a government or military network over an IP based communications connection.

These highly agile IP based communications sessions may include the required use of a National Security Agency (NSA) Type 1 accredited encryptor or an NSA Commercial Solutions for Classified (CSfC) Comprised Solution to protect sensitive or classified information and a classified computer, or computers, VoIP telephones, IP CCTV cameras, IP Video Teleconferencing Systems, or IP based sensors to view, edit, generate, or capture sensitive or classified data. These classified IP network connected appliances and devices are protected from exposing sensitive or classified information to the public IP network through the use of a NSA accredited High Assurance Internet Protocol Encryptor (HAIPE) Type 1 devices or NSA Commercial Solutions for Classified (CSfC) Comprised Solutions.

In these dynamic operational environments an individual may need to acquire, purchase, or authorize access to the IP network. Further, they may need to configure, establish, authenticate, or manage the way in which the NSA HAIPE or CSfC device connects, or interfaces, to the IP network, which may be the Internet or any other Wide Area Network. However, it is against government and military security policy to connect a computer that holds, or may hold, sensitive or classified information to an IP network for the purpose of acquiring, purchasing access to, authorizing us of, configuring, establishing a connection with, authenticating, or managing the connection or availability of an IP network in an effort to prevent potential inadvertent disclosure of sensitive or classified information.

Under the National Security Agency's (NSA) Commercial Solutions for Classified (CSfC) program a CSfC Comprised Solution may enable the use of commercially available security products in layered solutions for protection of restricted information of the highest level. The CSfC Comprised Solution may be used alternatively or in conjunction with a HAIPE encryptor to provide security when dealing with restricted material on a public network.

SUMMARY

Disclosed herein is a plurality of internal data network communications interfaces configured to communicate with at least one classified IP network device using a NSA approved CSfC Comprised Solution.

In one embodiment a first piece of hardware acts as a first layer and second piece of hardware acts as a second layer to implement a CSfC Comprised Solution in one physical enclosure. In another embodiment, one of the two hardware components is virtually implemented in software. In another embodiment both of the components are virtually implemented in software. In yet another embodiment the two components are connected externally to each other.

DETAILED DESCRIPTION

The following description is intended to convey an understanding of the invention by providing a number of example embodiments. It is understood, however, that the invention is not limited to these exemplary embodiments and details and one of ordinary skill in the art would appreciate the interoperability of using one embodiment with another embodiment.

Figure 1A:
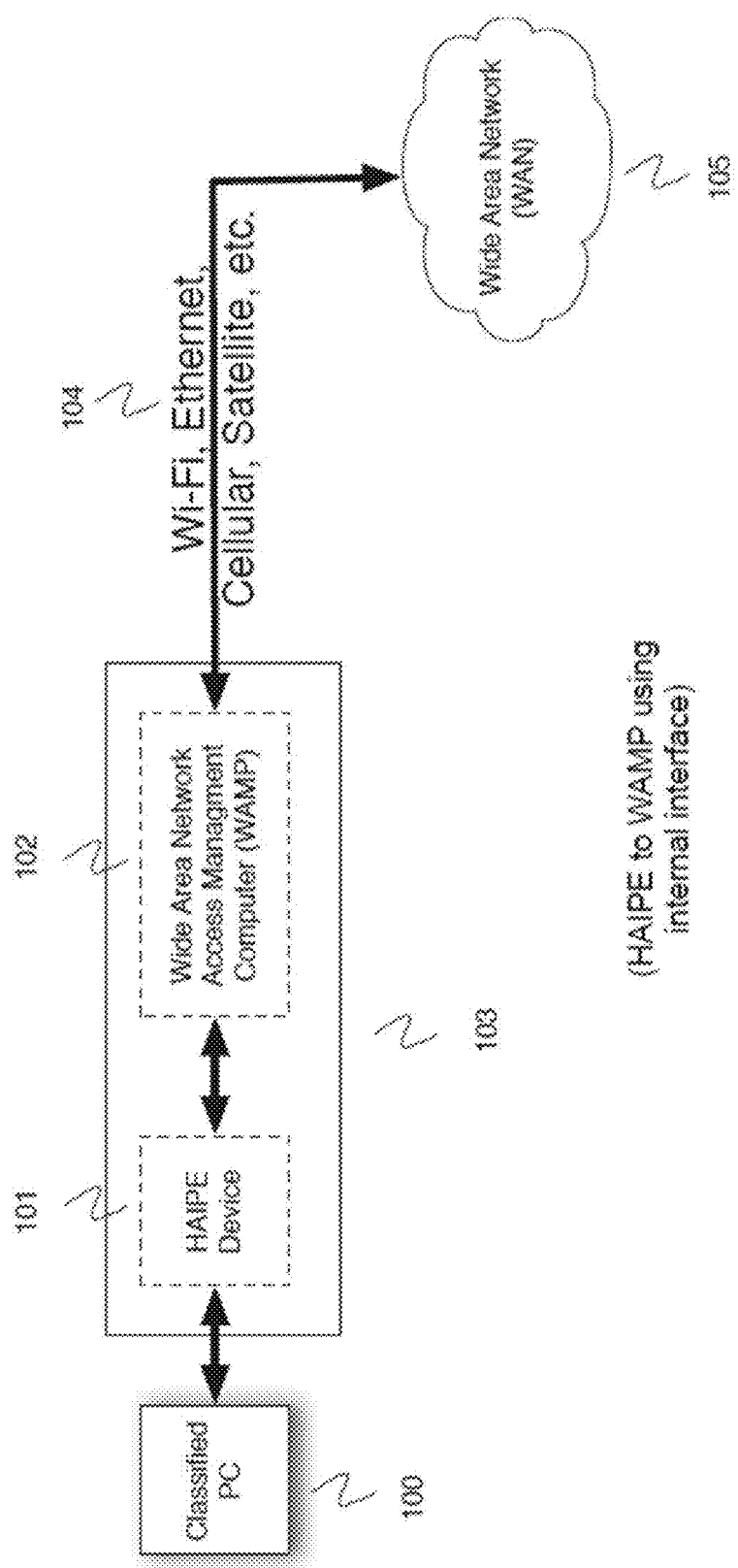
FIG. 1A is a block diagram of an example implementation of the wide area network access management computer implemented using internal interfaces.

In FIG. 1A a block diagram of an example implementation of the wide area network access management computer implemented using internal interfaces is shown where an unclassified computer, a wide area network access management computer 102, enables a classified computer 100, or computers, secured by a NSA HAIPE device 101, or devices, to communicate classified communications over IP networks 105. A communication system may include a classified computer terminal 100, such as a laptop device or portable computing device, for example, a netbook, ultra-mobile personal computer, voice over IP (VoIP) telephony device, IP network based sensor, or any other IP network based technology and a NSA HAIPE cryptographic device 101.

The wide area network access management computer 102 enables IP connectivity for the classified computing device 100, or devices through enabling IP connectivity for the NSA HAIPE device 101, or devices. The wide area network access management computer 102 may be connected directly to a NSA HAIPE device 101 on its internal network interface, and a public IP network 105 on its external network interface. The wide area network access management computer 102 may be included in a system of subsystems 103, where that system of subsystems 103 may include a NSA HAIPE device 101 and a wide area network access management computer 102.

The wide area network access management computer 102 may be configured to interface between the NSA HAIPE device 101, or devices and the internet protocol (IP) network 105 such that a secure channel is established between the classified computing device 100, or devices, protected by the NSA HAIPE device 101 attached on the internal network interface and a classified computer network which they seek to view, edit, or generate sensitive or classified data on or across reach through its external network interface.

The wide area network access management computer 102 may include a graphical user interface, internal network interfaces (such as an Ethernet interface, for example), external network interfaces (such as an Ethernet, 802.11 Wi-Fi, 802.16 Wi-Max, Bluetooth, 2G/3G/4G/5G Cellular, or satellite interface 104, for example), and a processing unit with an operating system (such as Microsoft Windows, Linux, OS X, for example). The processing unit performs the operations necessary to operate the internal network interfaces and external network interfaces, as well as present information to the graphical user interface and interpret user input from the graphical user interface. The processing unit leverages an operating system and associated applications to perform the processing and protocols associated with interconnecting the internal and external network interfaces including, but not limited to, routing protocols, proxy services, and encapsulation protocols. The processing unit also performs network client processing such as web browsing, video teleconference (VTC), VoIP telecommunications, chat, email and other processing to allow the user to interact with services provided on any of the attached networks.

An individual that needs to access sensitive or classified government or military networks must do so using a NSA HAIPE network encryptor 101 and a computing device 100 of some sort. The wide area network access management computer 102 may allow the NSA HAIPE device 101, and subsequent computing device 100, or devices, to gain access to IP data networks over various IP network connectivity options, using various IP networking protocols. The wide area network access management computer 102 acts as a go between for the NSA HAIPE 101 and the public IP network 105. The wide area network access management computer 102 is configured to interface between an IP network 105 and the classified IP network.

An individual may wish to use a hotel Ethernet connection to gain access to the Internet in order to connect back to a sensitive or classified network. However, most hotels require that the individual who wishes to use the hotel provided internet service to pay a small one time or recurring fee for service. This fee payment, and connectivity, takes place using a graphical user interface and an Internet browser software program running on this graphical user interface. The wide area network access management computer 102 may allow the individual to access an internet browser software program to allow for subscription to the hotel internet service, without having to connect the individual's classified computing device 100 to the public internet (which is against government and military security policy).

Additionally, the wide area network access management computer 102 may allow an individual, or individuals, to connect to many types of data network connections that allow for IP network connectivity. These connections include but are not limited to, Ethernet, 802.11 Wi-Fi, 802.16 Wi-Max, Bluetooth, 2G/3G/4G/5G Cellular, or satellite interfaces 104. Also, the wide area network access management computer 102 allows individuals to take advantage of various software-based performance enhancing protocols, applications, or other network or computing tools.

FIG. 1A shows a block diagram of an example implementation of the wide area network access management computer 102. The classified computing device 100 is connected to the NSA HAIPE device 101 and the NSA HAIPE device 101 is connected to the wide area network access management computer 102 on its internal network interface. The wide area network access management computer 102 is connected to the wide area network (WAN) 105 on its external network interface. Together, the NSA HAIPE device 101 and the wide area network access management computer 102 form a subsystem 103.

The wide area network access management computer 102 may include a graphical user interface to allow the user to access information and input commands. The wide area network access management computer 102 also includes an internal data network communications interface and an external data network communications interface. The internal data network communications interface allows for the connection of the wide area network access management computer 102 and the NSA HAIPE device 101. This connection may be established by an Ethernet interface. The external data network communications interface allows for the wide area network access management computer 102 to connect to the public IP network 105. The external data network communications interface may be connected to the public IP network 105 through a connection such as Ethernet, 802.11 Wi-Fi, 802.16 Wi-Max, Bluetooth, 2G/3G/4G/5G Cellular, or satellite interface 104.

The wide area network access management computer 102 may also include a processing unit which runs on an operating system. The processing unit operates the connections between the internal and external data network communication interfaces. The processing unit also enables the wide area network access management computer 102 to display information on the graphical user interface. The processing unit interprets the user input from the graphical user interface and processes the connections necessary for the internal and external data network communication interfaces. The processing unit allows the user to access services provided on any attached networks. The processing unit also performs client processing, including web browsing, video teleconferencing, VoIP telecommunications, chat, email and other services.

Figure 1B:
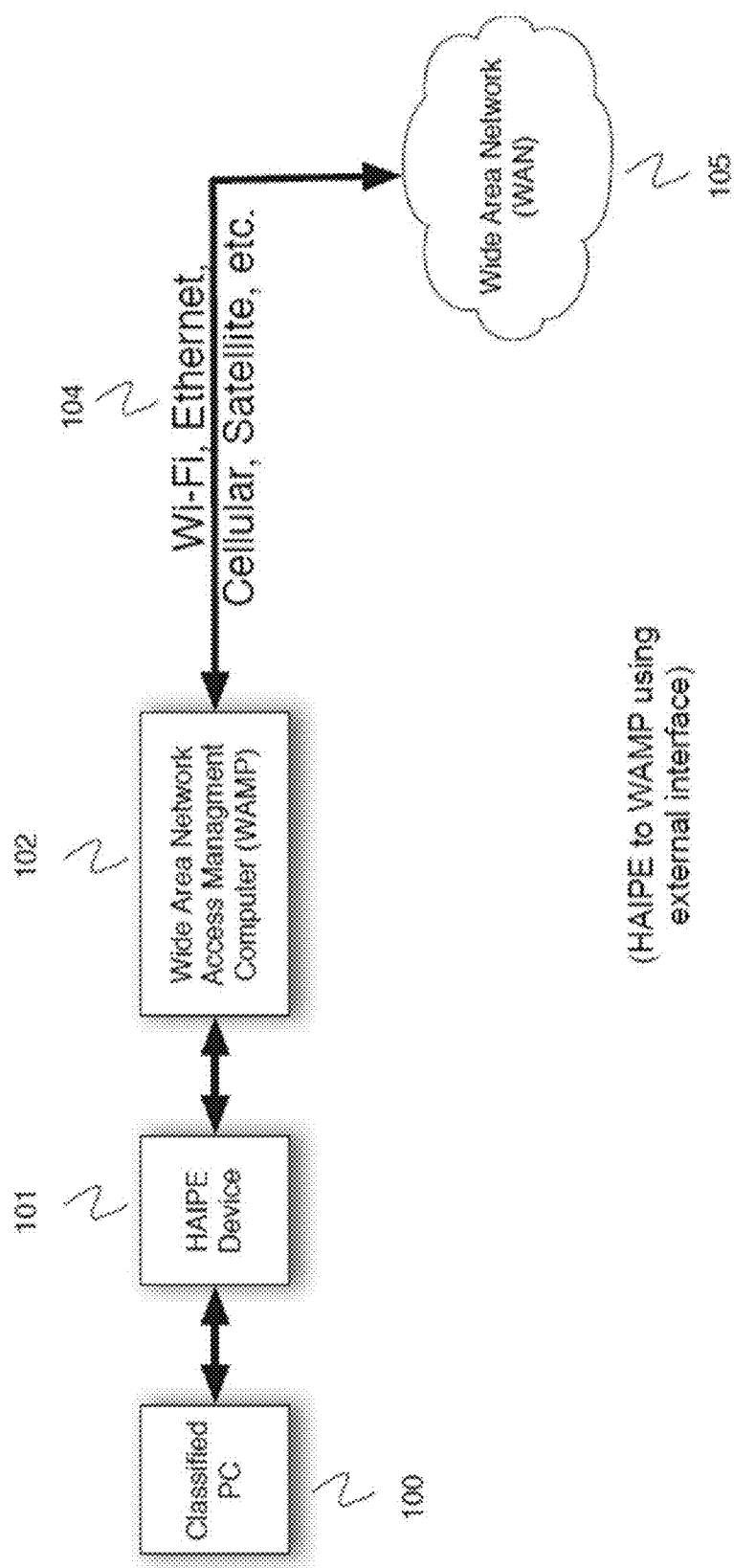
FIG. 1B is a block diagram of an example implementation of the wide area network access management computer implemented using external interfaces.

FIG. 1B shows a block diagram of an example implementation of a wide area network access management computer using external interfaces. The classified computing device 100 is connected to the NSA HAIPE device 101 and the NSA HAIPE device 101 is connected to the wide area network access management computer 102 on its external network interface. The wide area network access management computer 102 is connected to the wide area network (WAN) 105 on its external network interface. Together, the NSA HAIPE device 101 and the wide area network access management computer 102 are configured to provide individual to access an internet browser software program to allow for subscription to a hotel internet service, without having to connect the individual's classified computing device 100 to the public internet (which is against government and military security policy).

For a Commercial Solutions for Classified (CSfC) Comprised Solutions commercially available security products may be used in a layered configuration to provide protection for sensitive or classified information; such as sensitive or classified voice, data, video, information, etc. In a CSfC Comprised Solution a user may access restricted information by connecting a computing device to a first layer of encryption technology, which in turn connects to a second layer of encryption technology, which in turn provides the NSA required 2 layers of encryption technology required to access, extend, or protect sensitive or classified information, data and/or networks. In this disclosure the terms restricted, sensitive, classified, Confidential, Secret and Top Secret are referenced and interchangeable in so far as they serve to explain that in context the technological configuration is designed to restrict access and dissemination of information to certain people/devices; these terms, however, retain any well-known definitions relating to levels of secrecy as a person of ordinary skill in the art understands them in view of the U.S. Government Security Classifications, markings and handling.

In the IP networking domain CSfC equates to a dual encrypted tunneling approach (i.e. an Internet Protocol Security (IPSec) Virtual Private Network (VPN) tunnel within a second IPSec VPN tunnel=two layers of encryption/encrypted data, or a Media Access Control Security (MACSec) tunnel within a second MACSec tunnel=two layers of encryption/encrypted data, or an IPSec tunnel within a MACSec tunnel=two layers of encryption/encrypted data). This approach of using two encryption technologies in a layered approach is referred to as a CSfC Comprised Solution. The NSA has determined that double encrypting the data, as discussed herein, is cryptographically robust enough to protect classified information up to and including Top Secret and is a suitable alternative to using a Type 1 NSA Certified HAIPE device that is a Controlled Cryptographic Item (CCI) and Communication Security (COMSEC) device.

CSfC Comprised Solutions may serve as an alternative to traditional Type 1 NSA Certified HAIPE device use, eliminating the concerns of using Type 1 CCI and COMSEC devices in "hostile" environments where there is a high threat of the CCI item being lost, stolen, or taken by adversaries. Also, CSfC may provide a user with the ability to deploy cutting-edge technology from the commercial market rather than waiting for NSA Type 1 COMSEC devices to "catch up" with commercial products' technological capabilities.

Figure 2A:
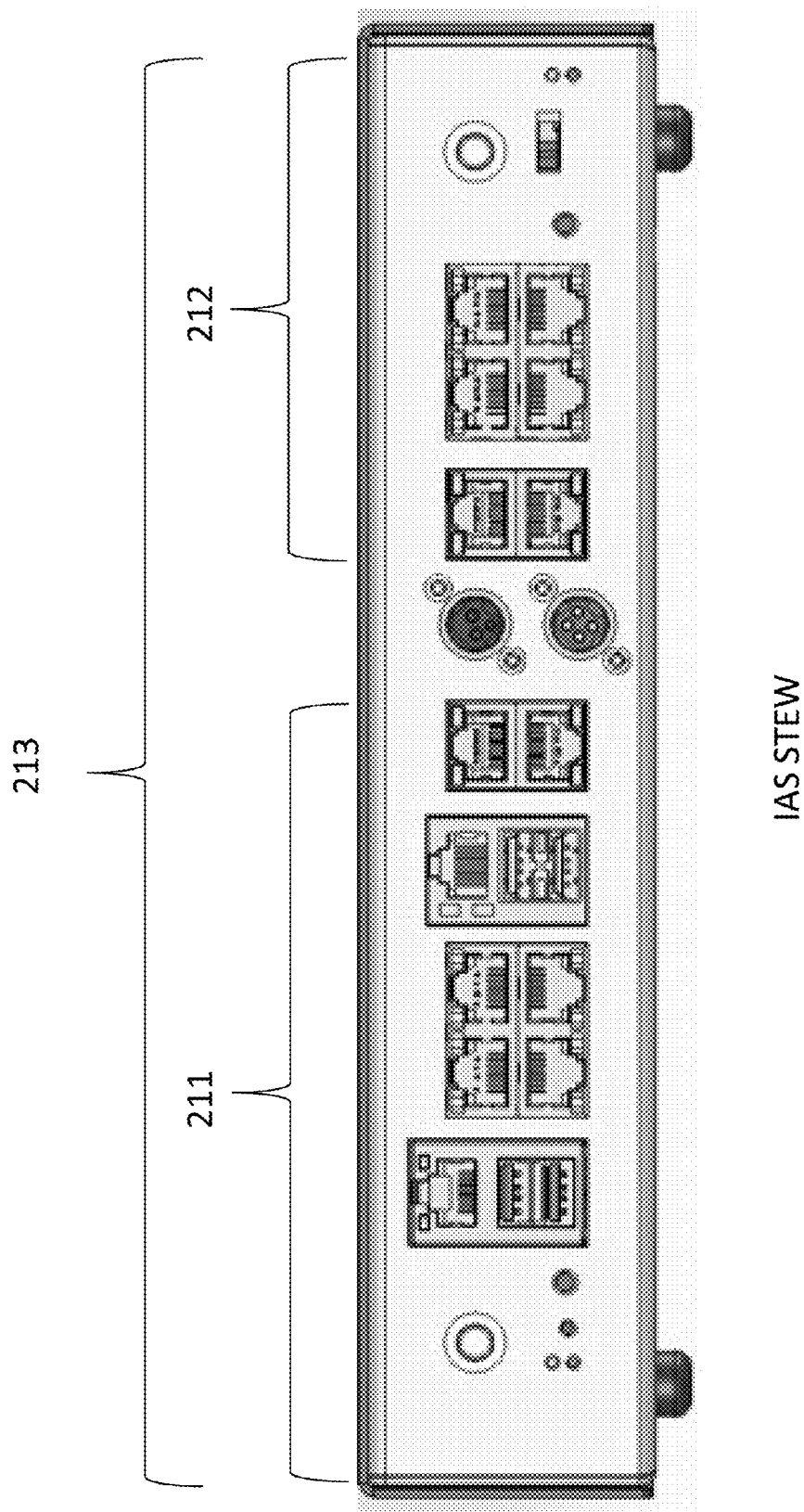
FIG. 2A depicts an example of a two networking components in one enclosure.

FIG. 2A shows an embodiment of an apparatus which may be used to provide a CSfC Comprised Solution. In FIG. 2A a Small Tactical Executive Wide Area Network (WAN) (STEW) contains at least two networking components 211 and 212 in one enclosure 213. The two components may be connected internally for a CSfC operation or may connect externally. For example, the two components 211 and 212 may be two components, such as an Information Assurance Specialists (IAS) Router and a Cisco 5915 Embedded Service Router (ESR). The first component 211 may be an embedded computer configured to run at least an IAS Router, Cisco ASAv, Cisco CSR100V, Cisco ESR5921, Aruba Virtual Mobile Controller, Windows based operating system, a Windows based operating system with Cisco AnyConnect or Aruba VIA, Brocade's virtual router, and Palo Alto Networks' virtual router. In one example the first component may be a VPN Gateway/Router capable of performing IPSec VPN or MACsec modes of operation compliant to the NSA CSfC program requirements. The STEW may consume WAN technologies that interface via physical Ethernet, 3G/4G/5G Cellular, and/or Wi-Fi Client WAN. The first component 211 may be capable of serving as a multi-role device for a given system configuration. The second component 212, such as a Cisco ESR5915, may be a VPN Gateway/Router capable of performing IPSec VPN or MACsec modes of operation compliant to the NSA CSfC program requirements. The first or second component found within a STEW may have a web-based GUI allowing for easy access for non-technical users.

Figure 2B:
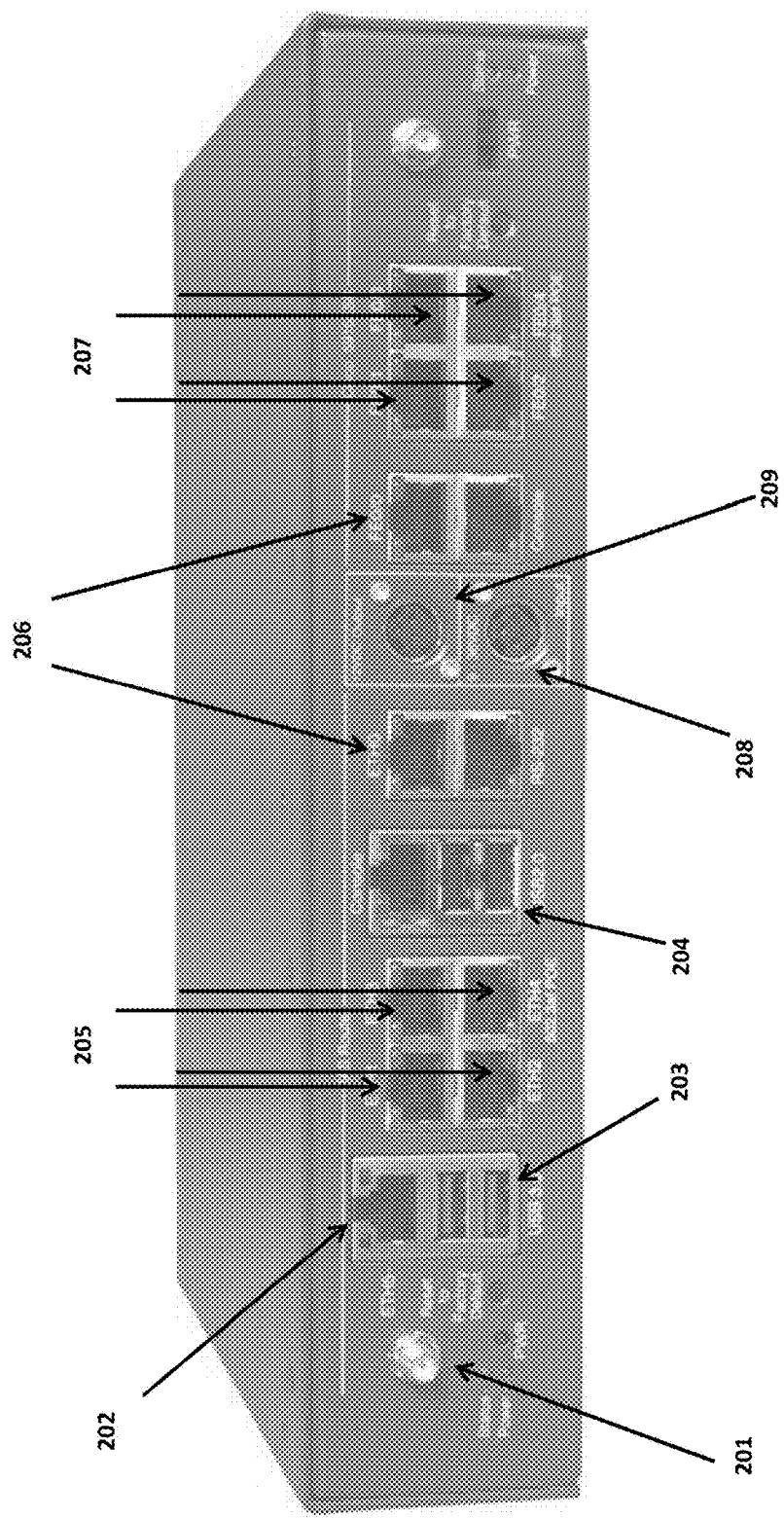
FIG. 2B depicts an example of a Small Tactical Executive WAN (STEW) and STEW-MV.

FIG. 2B shows an example of a STEW that contains an IAS Router MICRO, which may support supports 802.11 a/b/g/n/ac Wi-Fi radio for client mode, access point (AP) mode, or both modes via an RP-SMA Antennas 201. The STEW may further contain a WAN Port 202, USB 3.0 ports for multiple cellular modems/smartphone tethering 203 and USB 2.0 ports for multiple cellular modems/smartphone tethering 204. The STEW may also contain LAN ports for utilizing the IAS Router VPN capabilities 205. The STEW may also have LAN ports (connected internally for CSfC operation or used to connect externally to another device, such as HAIPE) 206, Cisco ESR5915 LAN ports 207, a 9-36 VDC input 208 and a 12 VDC or 24 VDC output 209 which may be used as an option when not used in CSfC mode to connect a HAIPE. The STEW may also contain a cellular modem(s) internally.

Figure 3:
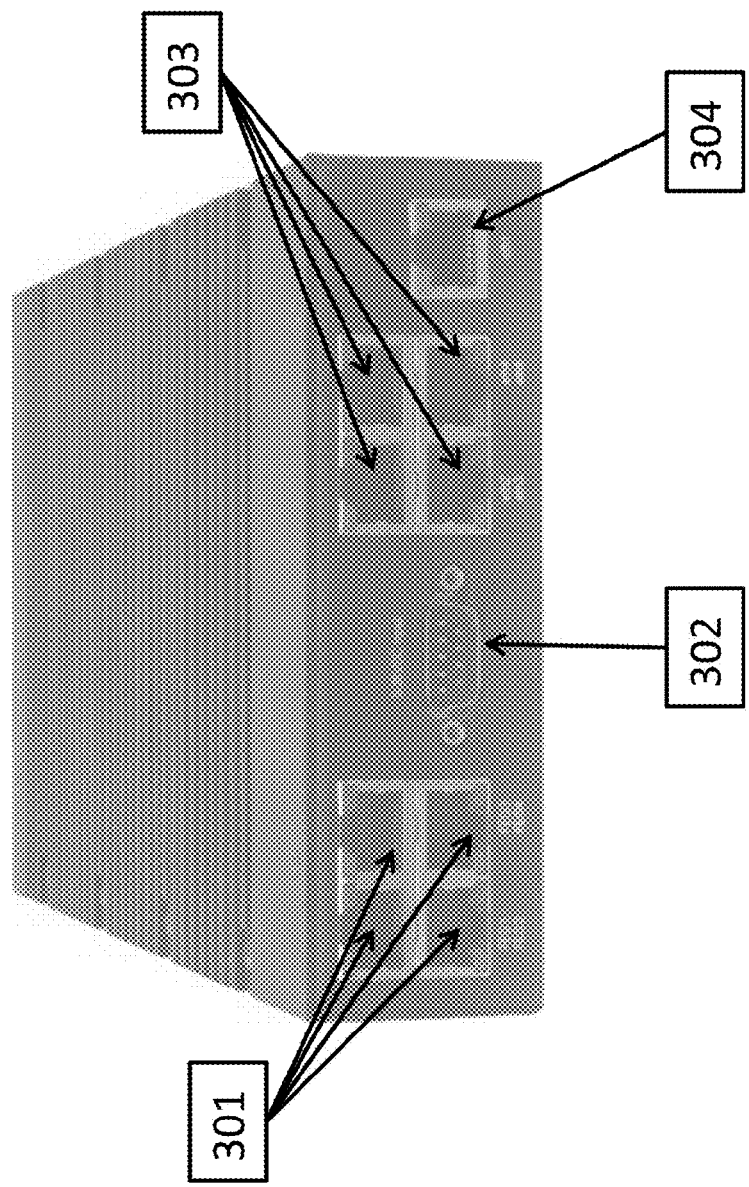
FIG. 3 depicts an example of a rear view of the IAS KG-RU and KG-RU-MV.

FIG. 3 shows an example of a CSfC comprised solution called the IAS KG-175D Replacement Unit (KG-RU) that contains two components to replace the need for a Type 1 HAIPE device such as the IAS KG-175D. The IAS KG-RU may be capable of providing up to eleven RJ45 ports: six Gigabit on the first router such as an IAS Router (five shown 303 and 304, and one not shown configured internally), and five FE on the second router such as a Cisco LAN ESR5915 (four shown 301 and one not shown configured internally), wherein the internally configured ports connect the first router to the second router. The IAS KR-RU also contains a 9-36 VDC input 302.

The IAS Router within the KG-RU may be capable as serving as a multi-role device as well as supporting multiple VPN modes such as IPSec and SSL. The IAS Router within the KG-RU may also be capable of supporting MACsec. The IAS Router within the KG-RU may also have a web-based GUI. The second router (Cisco ESR5915) may be capable of supporting multiple VPN modes such as IPSec and SSL. The second router (Cisco ESR5915) may also be capable of supporting MACsec.

Figure 4:
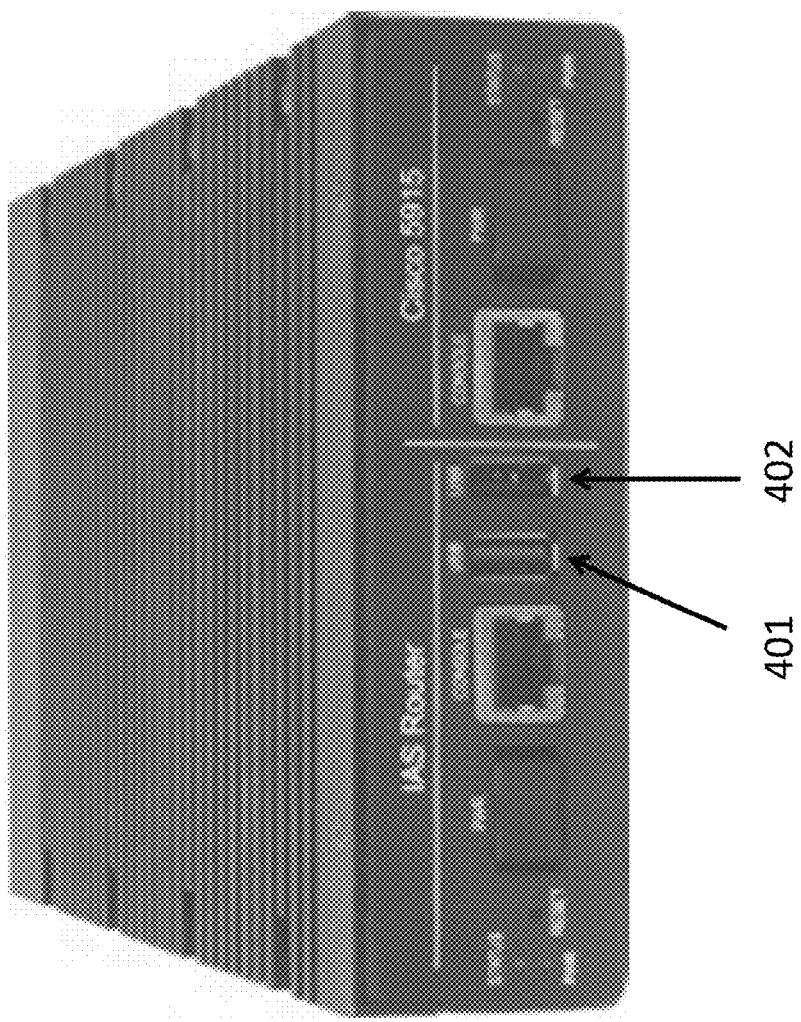
FIG. 4 depicts an example of a front view of the IAS KG-RU and KG-RU-MV.

FIG. 4 shows an example of a CSfC Comprised Solution, such as the front of an IAS KG-RU, that includes an IAS Router MICRO paired with a Cisco ESR5915. In the CSfC Comprised Solution of FIG. 4, USB 3.0 401 and USB 2.0 402 ports can be utilized for multiple cellular modems and smartphone tethering. Additionally/alternatively, the USB ports may provide for use with a USB Key with Crypto Ignition Key (CIK) like functionality.

Figure 5:
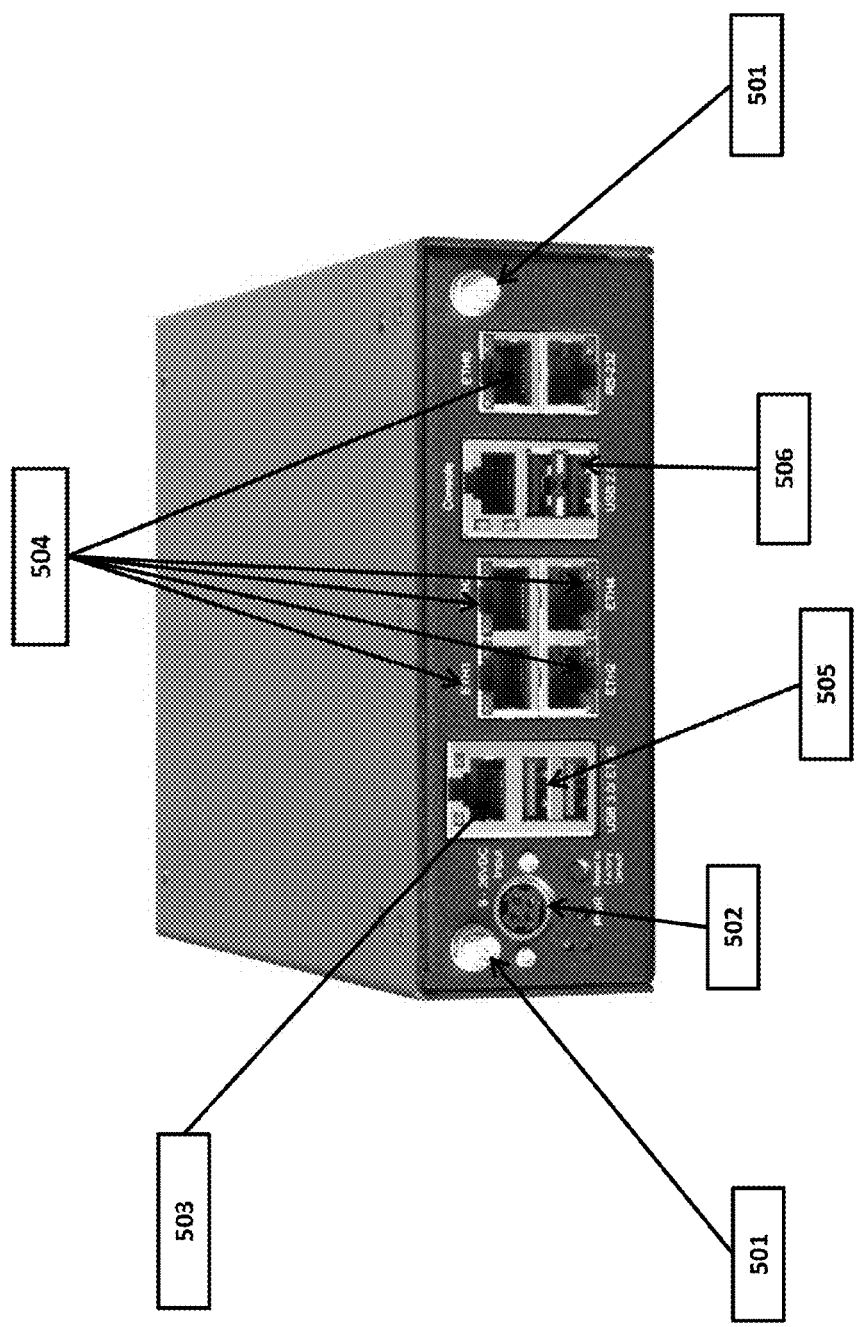
FIG. 5 depicts an example of a front view of the IAS Router MICRO.

FIG. 5 shows an example embodiment of a CSfC VPN Gateway appliance where an IAS Router MICRO may have an 802.11 a/b/g/n/ac Wi-Fi radio with antenna ports 501 for client/AP mode or both. There may also be a 9-36 VDC input 502, one WAN port 503, five LAN ports 504, (at least one of which is 802.3af POE), that may utilize an IAS Router VPN, Cisco ESR5921, or the like. FIG. 5 also discloses USB 3.0 505 and USB 2.0 506 ports as well as a 12 VDC or 24 VDC output for HAIPE located on the rear of the device (not pictured). The Router MICRO may also contain a 3G or 4G cellular modem internally.

Figure 6:
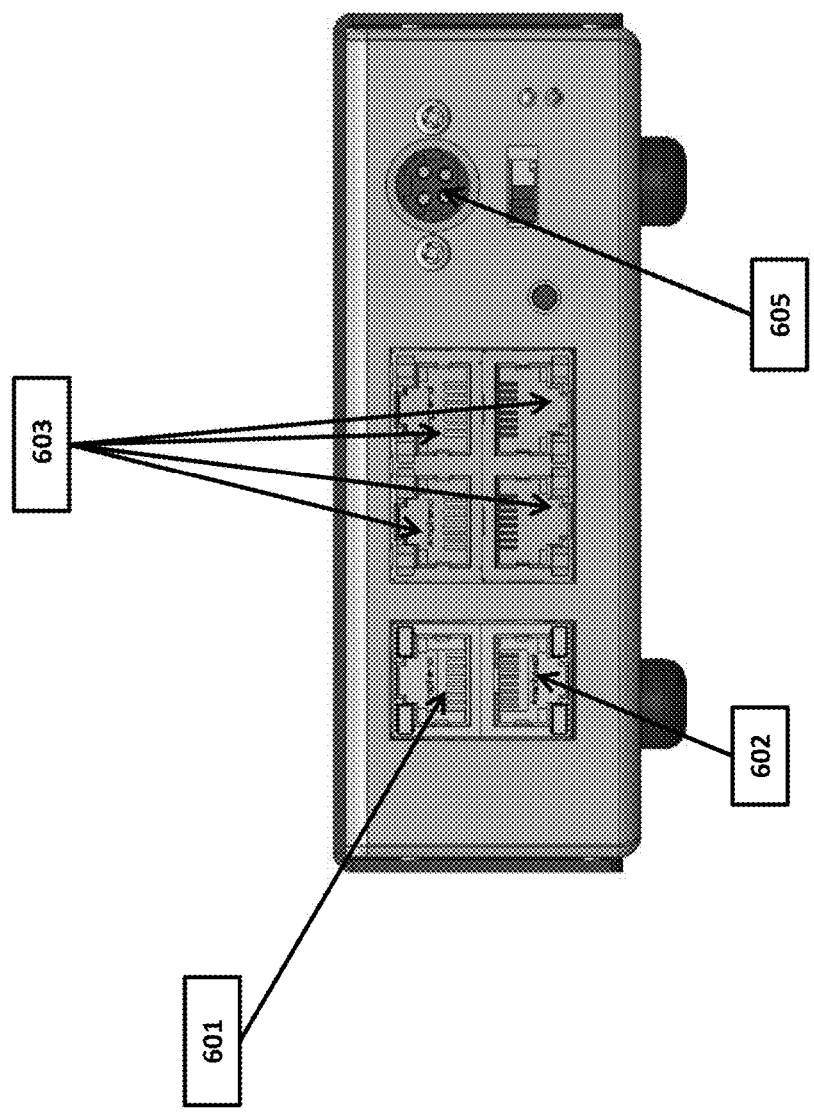
FIG. 6 depicts an example of a front view of the IAS ESR5915 router.

FIG. 6 shows an example embodiment of a CSfC VPN Gateway where a IAS ESR5915 has one Cisco WAN port 601, one console port 602, four Cisco ESR5915 LAN ports 603 (at least one of which is 802.3af POE), one 9-36 VDC input 605, and one 12 VDC or 24 VDC output for HAIPE located on the rear of the device (not pictured).

Figure 7:
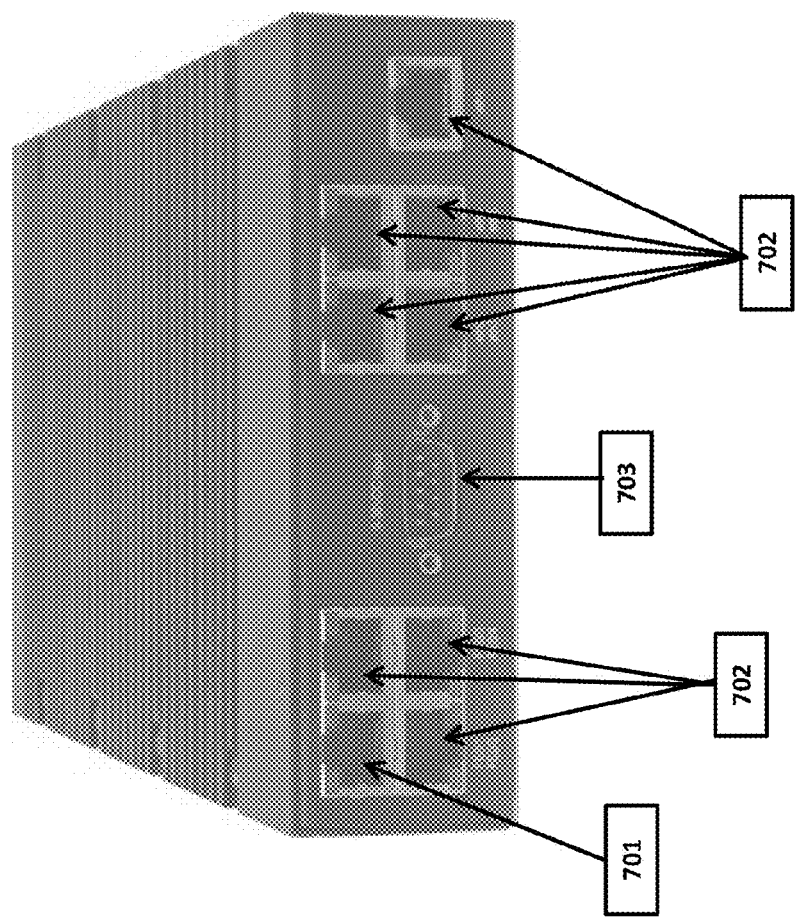
FIG. 7 depicts an example of a rear view of the KG-RU.

FIG. 7 shows another example embodiment of a CSfC Comprised Solution where an IAS ESR5915 Virtual Machine Server (VMS) has a Cisco WAN port 701, a plurality of Cisco switched ports 702, and a 9-36 VDC input 703. An IAS ESR VMS may be based on the IAS KG-RU form factor but may not include IAS Router firmware. The Cisco ESR5915 router may enable Cisco IOS and Cisco proprietary protocols capabilities.

Figure 8:
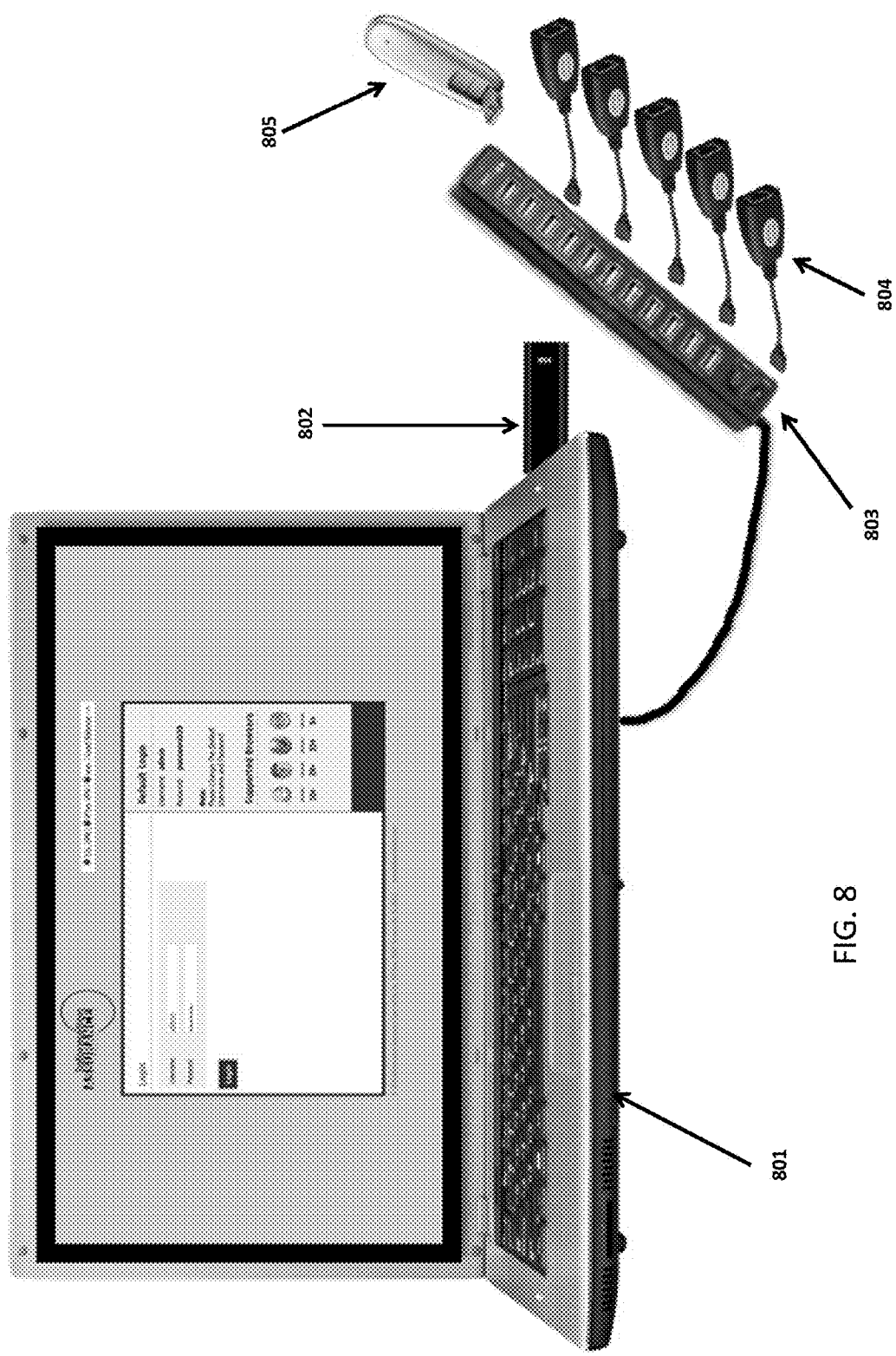
FIG. 8 depicts an example of a laptop utilized as a router.

FIG. 8 shows an example embodiment of a CSfC Comprised Solution where a Commercial Off The Shelf (COTS) laptop 801 may be utilized as a CSfC VPN Gateway router or CSfC Comprised Solution after being booted from internal or external non-volatile memory 802 containing one or more VPN Gateway router firmware or virtual machines. Also shown is a powered USB hub 803 which may be attached to the laptop 801 for use with USB to Ethernet dongles 804 and/or cellular modems 805. The cellular modem(s) 905 may also be attached via USB interfaces, Wi-Fi from the laptop's 801 internal Wi-Fi, or Bluetooth radio.

Figure 9:
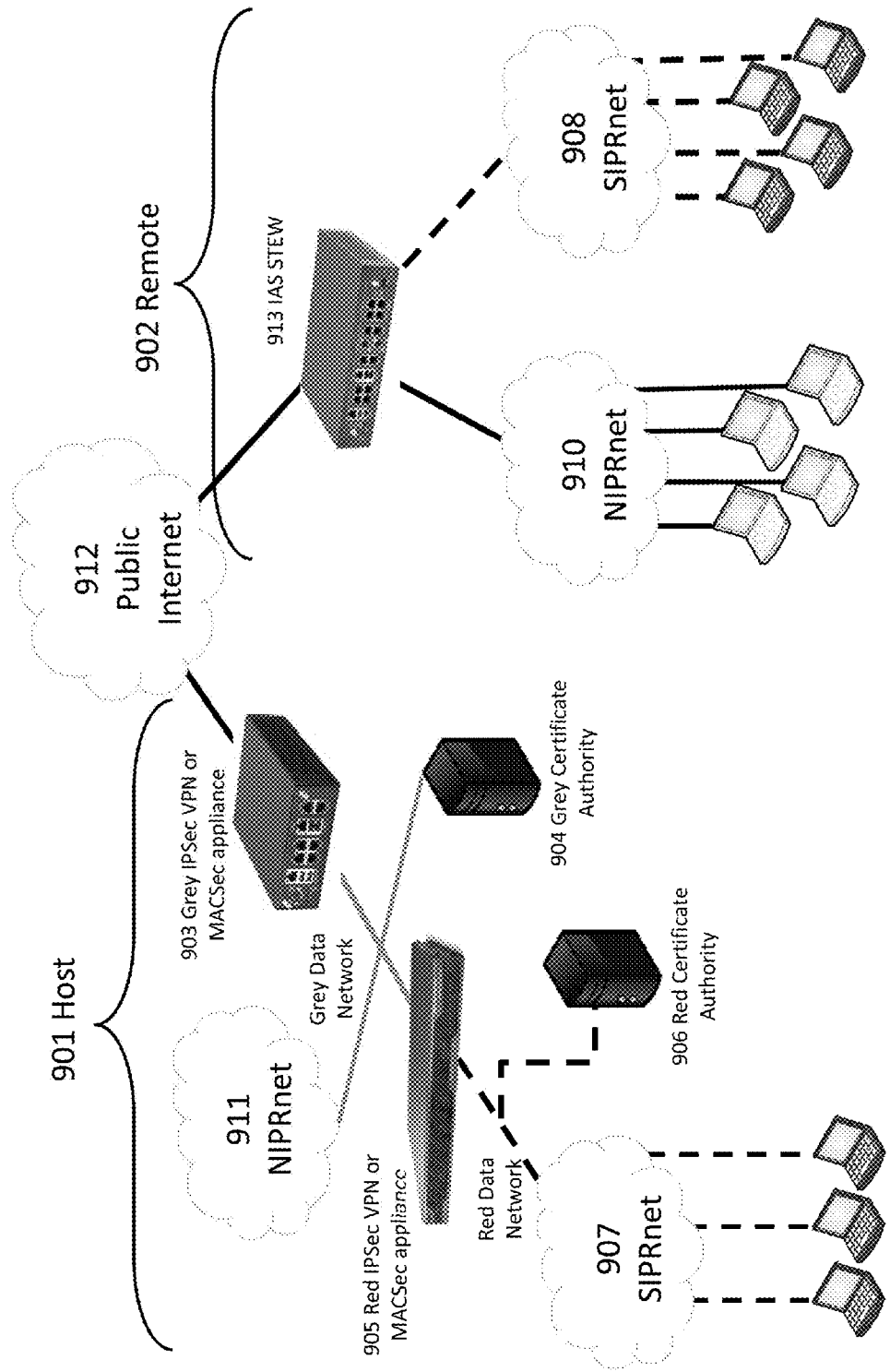
FIG. 9 depicts an example of a CSfC network topology.

FIG. 9 shows an example of using a CSfC in a network with a host 901 and remote 902 network configuration. The host 901 configuration may be comprised of an outer/Grey VPN gateway 903 (the IAS Router MICRO) and a Grey network certificate authority 904 which operates in a Non-classified Internet Protocol (NIPRnet) relative to the remote. Reference to a Grey designation shall constitute the first layer of a CSfC encryption which has not yet established a two layer connection deemed to be secure enough for the exchange of restricted information. The host 901 configuration may also include an inner/Red VPN gateway 905 (the Cisco ASA or other CSfC approved gateway device), and a Red network certificate authority 906. Reference to a Red designation constitutes the second layer of a CSfC encryption which has established a secure state for exchanging restricted information. The Red data network may provide the final connection to the Secret Internet Protocol Network (SIPRnet) or other classified network 907 and is illustrated using dashed lines. The remote 902 network configuration may be comprised of a CSfC apparatus 913, such as those described herein. For example, an IAS STEW 913 may be used which contains an IAS Router MICRO and ESR5915 within a single form factor. Similar to embodiments discussed herein, the IAS STEW 913 may provide a connection from a SIPRnet 908 of a remote user(s) wishing to connect to a host SIPRnet 907. Because of the two layered security implementation in a CSfC Comprised Solution the intermediate connection may be provided over a ubiquitous public network 912, such as the Internet. In FIGS. 9-13 like numbers may correspond to like description, such as 901 host and related description may correspond to 1001 host, 1101 host, 1201 host, and 1301 host unless explicitly differentiated from one another as discussed herein.

Figure 10:
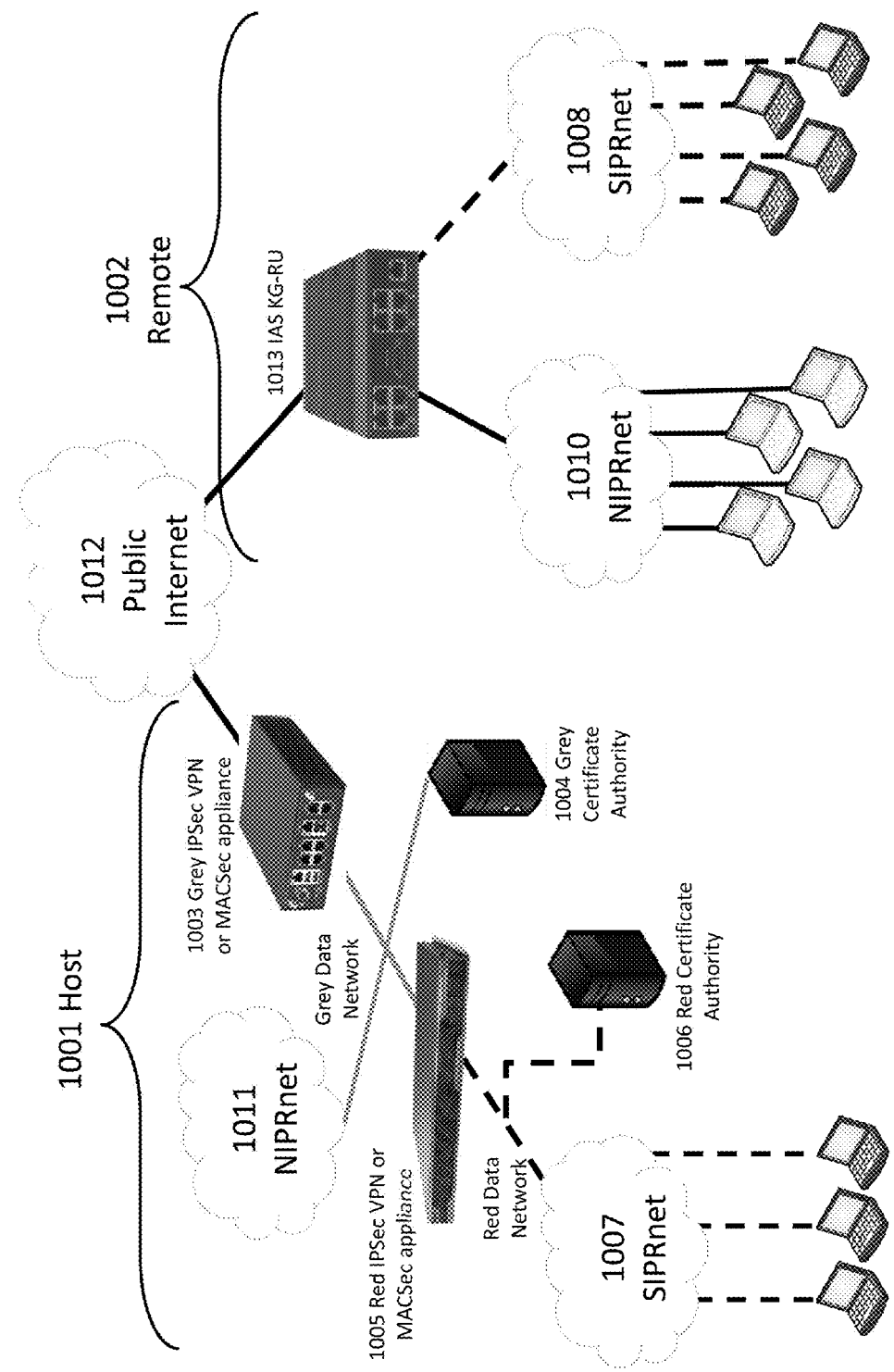
FIG. 10 depicts an example of a CSfC network topology.

FIG. 10 shows an example embodiment of a network configuration for a CSfC implementation similar to that of FIG. 9 except the remote network configuration CSfC apparatus 1013 may use an IAS KG-RU 1013 as described herein. The IAS KG-RU may contain an IAS Router and Cisco ESR5915 within a single form factor.

Figure 11:
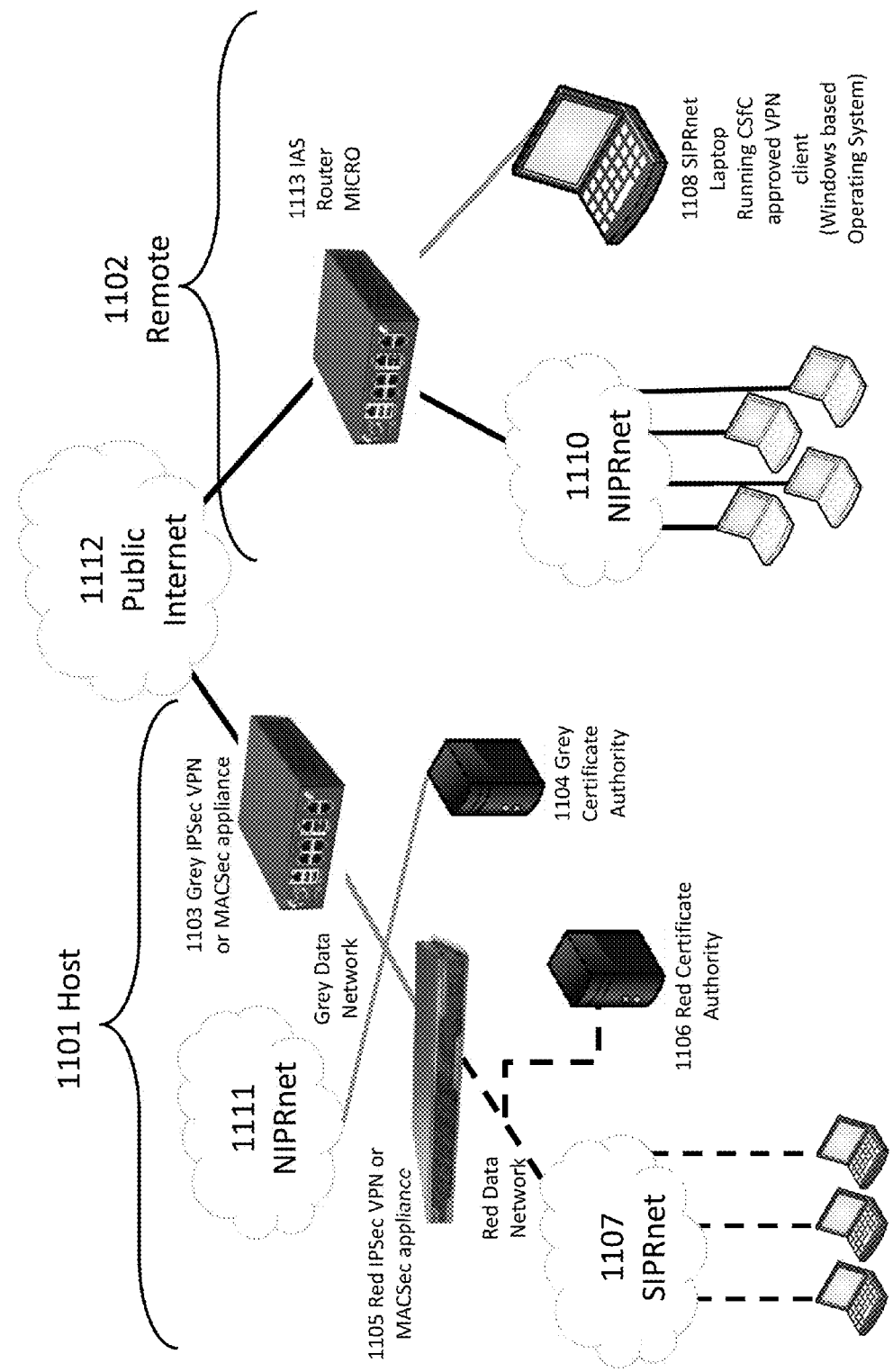
FIG. 11 depicts an example of a CSfC network topology.

FIG. 11 shows an example embodiment of a network configuration for a CSfC implementation similar to that of FIG. 9 except the remote network configuration CSfC apparatus 1113 may include a first layer IAS Router MICRO and second layer VPN gateway (a Secret Internet Protocol Router Network (SIPRnet) laptop running a CSfC approved VPN Client (Microsoft Windows Operating System with Cisco AnyConnect, Aruba VIA, or Microsoft's native VPN client)).

Figure 12:
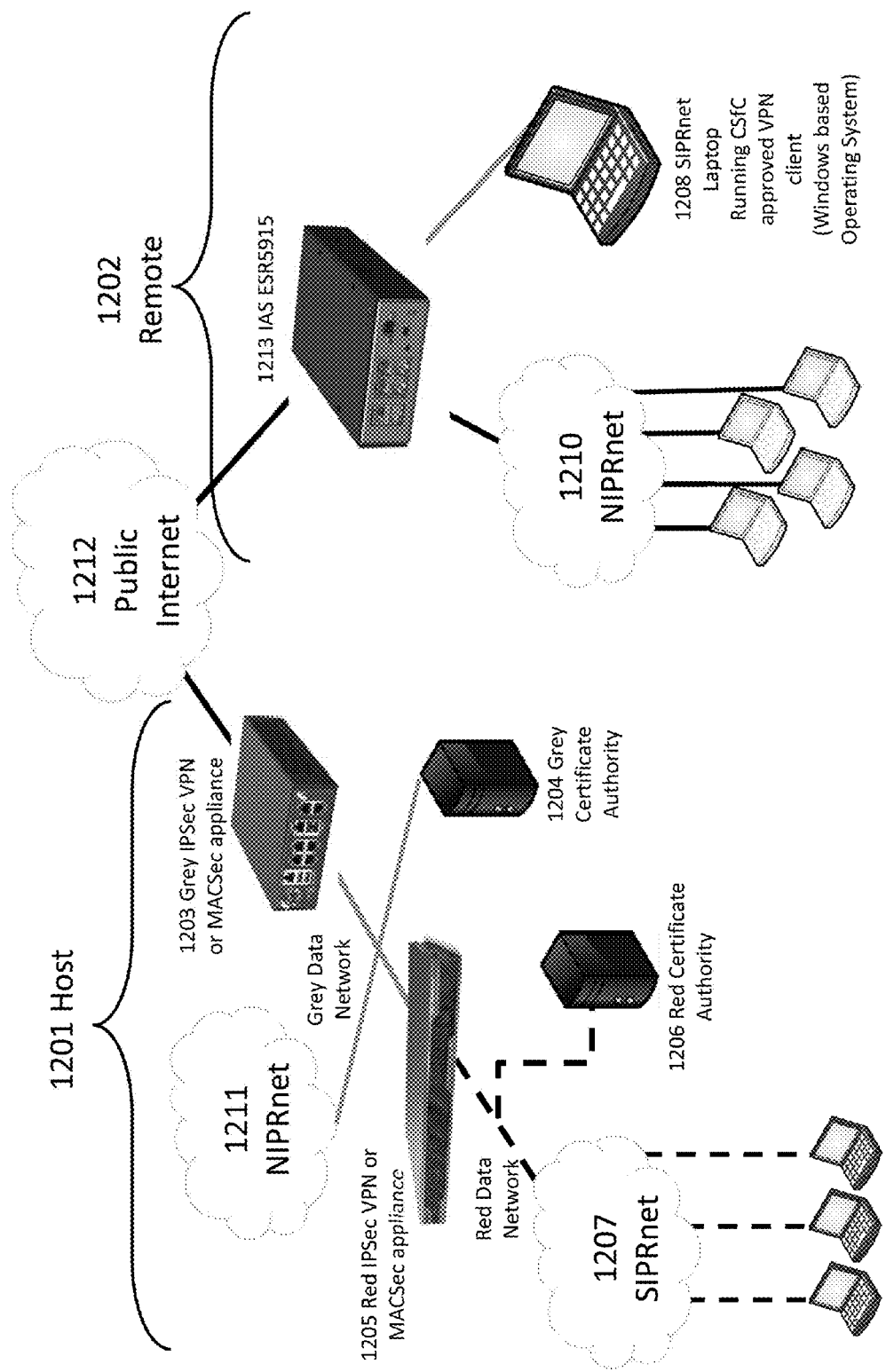
FIG. 12 depicts an example of a CSfC network topology.

FIG. 12 shows an example embodiment of a network configuration for a CSfC implementation similar to that of FIG. 9 except the remote network configuration CSfC apparatus 1213 may include a first layer the IAS ESR5915 router and second layer VPN gateway (a Secret Internet Protocol Router Network (SIPRnet) laptop running a CSfC approved VPN Client (Microsoft Windows Operating System with Cisco AnyConnect, Aruba VIA, or Microsoft's native VPN client))

Figure 13:
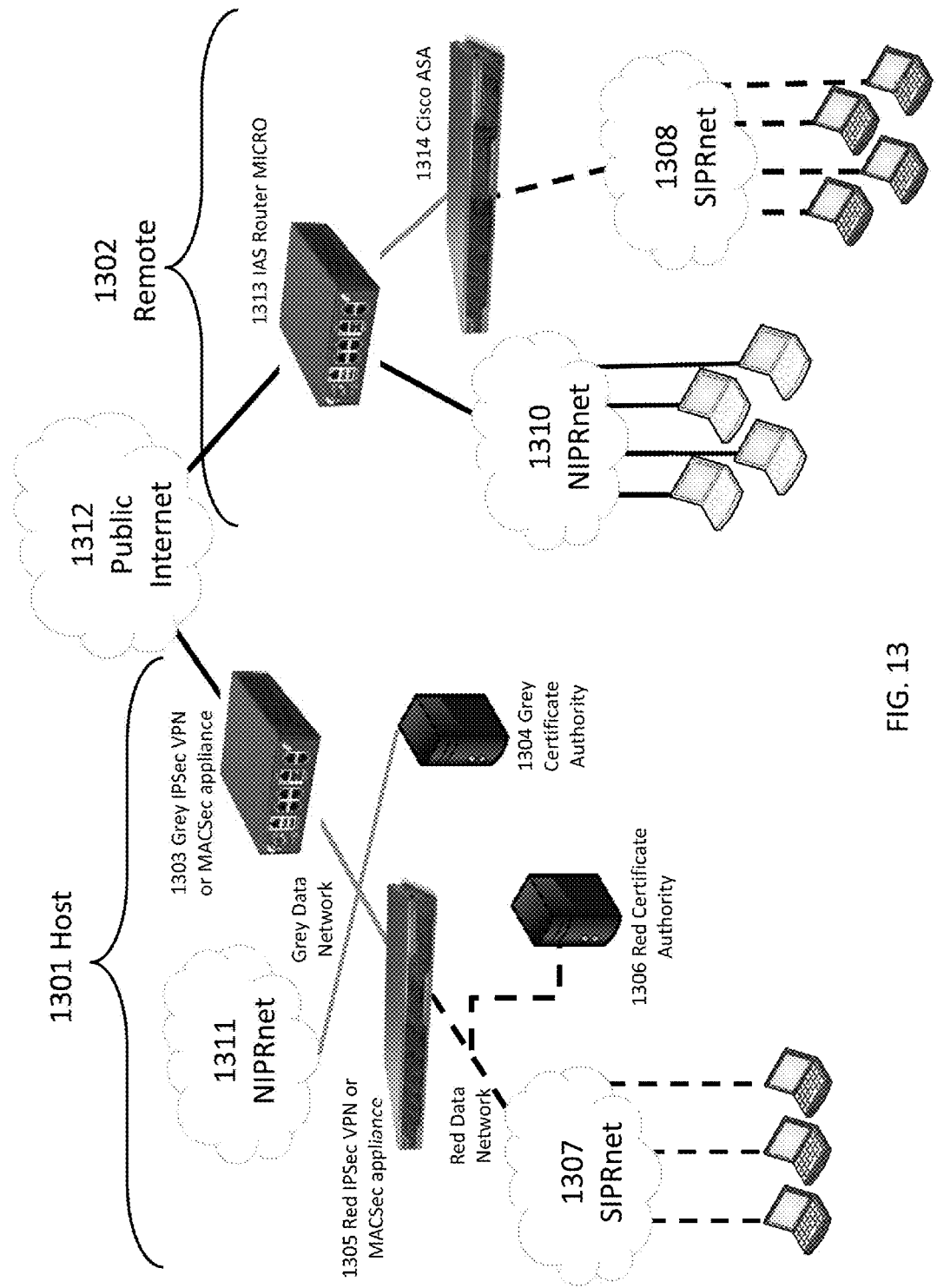
FIG. 13 depicts an example of a CSfC network topology.

FIG. 13 shows an example embodiment of a network configuration for a CSfC implementation similar to that of FIG. 9 except the remote network configuration CSfC apparatus 1313 may include a first layer IAS Router MICRO and a second layer VPN gateway 1314 (any CSfC listed VPN gateway).

Figure 14:
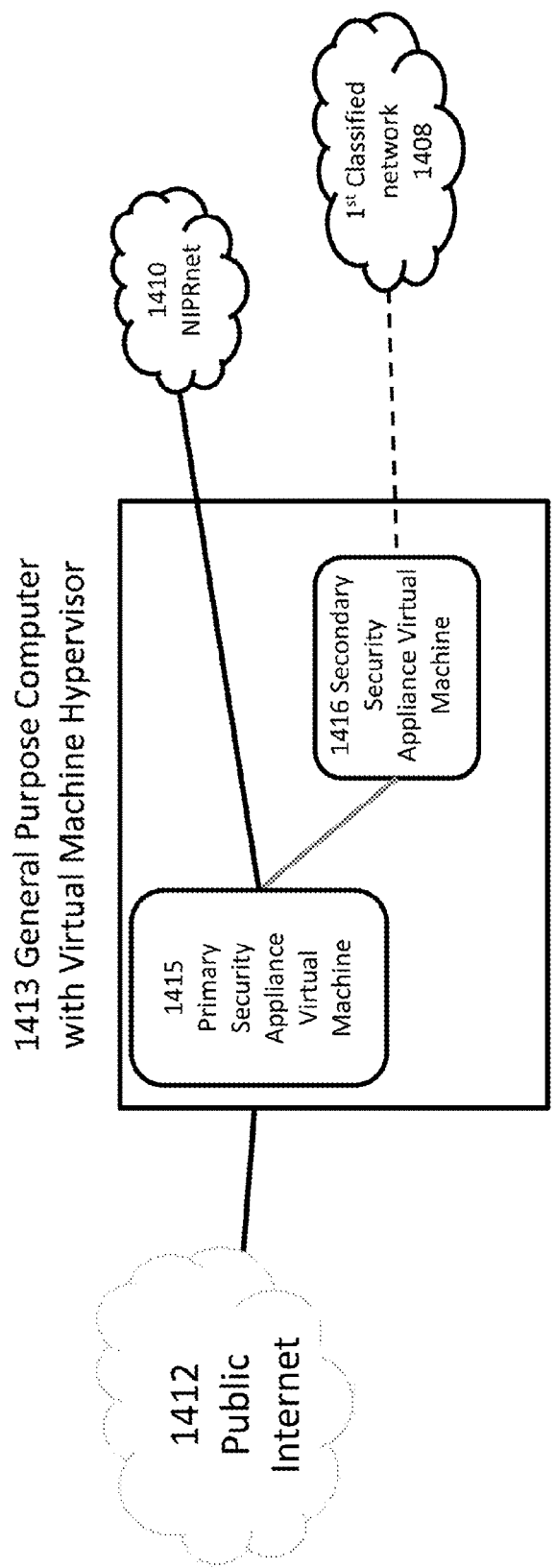
FIG. 14 depicts an example of a CSfC network topology.

FIG. 14 shows an example embodiment of a remote network configuration for a CSfC implementation similar to that of the remote network configuration of FIG. 9 except the remote network configuration includes a General Purpose Computer with Virtual Machine Hypervisor 1413 as the CSfC apparatus which is configured to run a First Security Appliance Virtual Machine 1415 that serves as the first layer and a Second Security Appliance Virtual Machine 1416 that serves as the second layer providing access to a classified network 1408.

Figure 15:
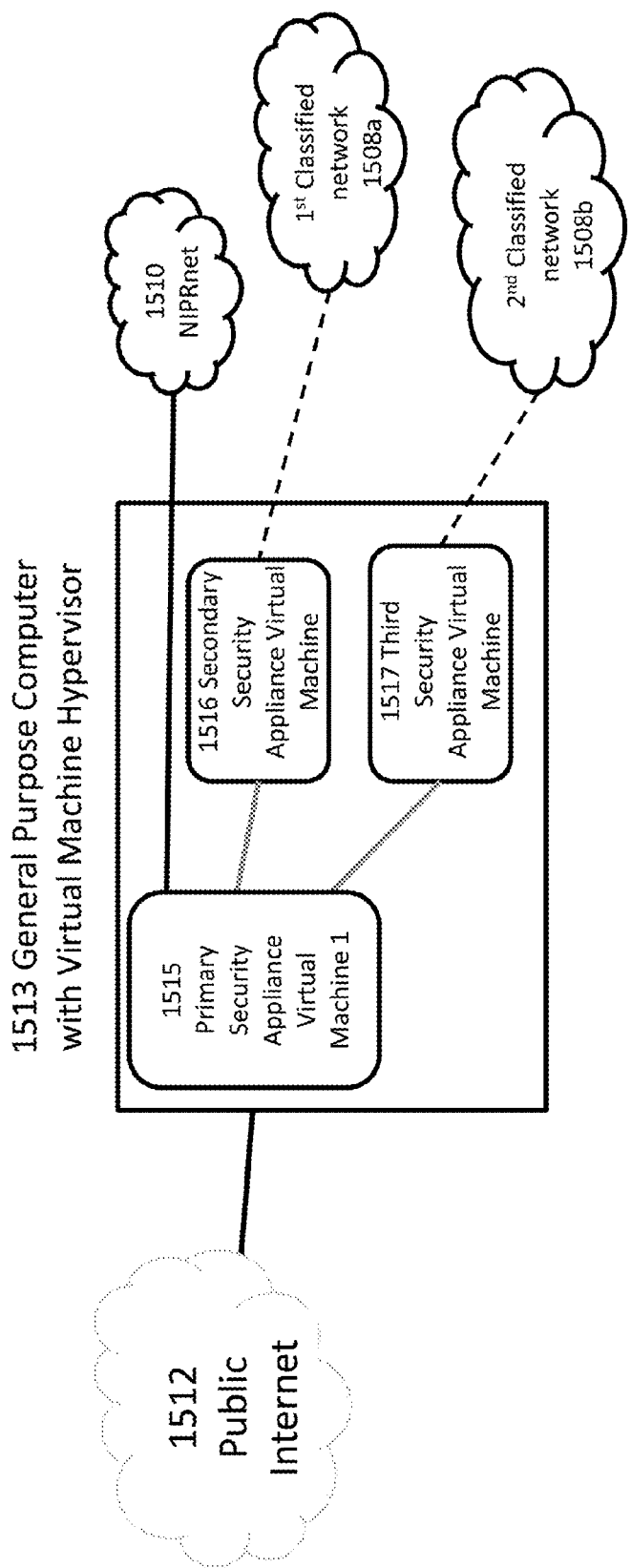
FIG. 15 depicts an example of a CSfC network topology.

FIG. 15 shows an example embodiment of a remote network configuration for a CSfC implementation similar to that of FIG. 14 except that there are two Secondary Security Appliance Virtual Machines 1516 and 1517 that provide two separate classified networks 1508*a* and 1508*b* respectively.

Reference to hardware, apparatuses, and other related computing devices that may handle networking functions may be comprised of a processor and a non-transitory storage medium containing software and/or firmware executed by the processor. The hardware, apparatuses, and the like may be embodied in a tablet, a smartphone, a desktop computer, a laptop, a notebook, an embedded computer, or other such computing devices. Networking hardware discussed herein may be any networking hardware such as routers that may be commercially available or virtual in nature that are executed in a computing environment.

What is claimed is:

1. A network access management device configured to provide secure communications to one or more users through an unclassified network, the device comprising:

a plurality of internal data network communications interfaces configured to communicate with at least one user device implementing multi-layered encryption configured for classified applications;

an external data network communications interface configured to communicate with an unclassified network; and a processor configured to perform processing and routing protocols associated with interconnecting the internal data network communications interface and the external data network communications interface, using an inner and outer IP network tunnel components, and associated with subscribing the network access management device to the unclassified network, wherein data is communicated from the at least one user device over the unclassified network via the network access management device on a condition that the network access management device has been configured to access the unclassified network.

2. The network access management device of claim 1, wherein the user device comprises one or more of a classified computing machine, Voice over IP (VoIP) device, IP video teleconferencing (VTC) device, IP CCTV camera, and an IP sensor device.

3. The network access management device of claim 1, wherein subscribing the network access management device to the unclassified network comprises configuring the external data network communications interface for paid services on the unclassified network using an internet browser via a user interface.

4. The network access management device of claim 1, wherein subscribing the network access management device to the unclassified network comprises configuring the external data network communications interface for unpaid services on the unclassified network using an internet browser via a user interface.

5. The network access management device of claim 1, further comprising: a user interface configured to facilitate classified network communications of at least one of a file transfer, web browsing, video teleconferencing (VTC), voice over IP (VoIP) telecommunications, messaging, and e-mail.

6. The network access management device of claim 1 wherein the external data network communications interface is an 802.11 Wi-Fi interface.

7. The network access management device of claim 1 wherein the external data network communications interface is a cellular interface.

8. The network access management device of claim 1 wherein the external data network communications interface is a satellite interface.

9. The network access management device of claim 1 wherein the external data network communications interface is a wired interface.

10. The network access management device of claim 1 wherein the inner CSfC approved IP network tunnel technology comprises a networking device or software running on a computing device performing networking functions.

11. The network access management device of claim 10 wherein the networking device is one of a router, virtual machine server, cloud services based router, adaptive security virtual appliance, and an embedded services router.

12. The network access management device of claim 10 wherein the software is one of a Virtual Mobile Controller, software based router, VPN gateway, native networking functions of an operating system.

13. The network access management device of claim 10 wherein the computing device is a laptop, personal computer, tablet, smartphone, notebook, personal digital assistant, smartwatch, or internet of things device.

14. The network access management device of claim 1 wherein the outer CSfC approved IP network tunnel technology comprises a networking device or software running on a computing device performing networking functions.

15. The network access management device of claim 14 wherein the networking device is one of a router, virtual machine server, cloud services based router, adaptive security virtual appliance, and an embedded services router.

16. The network access management device of claim 14 wherein the software is one of a Virtual Mobile Controller, software based router, VPN gateway, native networking functions of an operating system.

17. The network access management device of claim 14 wherein the computing device is a laptop, personal computer, tablet, smartphone, notebook, personal digital assistant, smartwatch, or internet of things device.

18. The network access management device of claim 1, wherein the inner and outer network tunnel components use multi-layered encryption configured for classified applications.

19. The network access management device of claim 1, wherein the inner and outer network tunnel components utilize dual Internet Protocol Security (IPSec) or Media Access Control Security (MACSec).

* * * * *